United States Patent [19]

Immega

[11] Patent Number: 4,826,206
[45] Date of Patent: May 2, 1989

[54] TENSION ACTUATOR LOAD SUSPENSION SYSTEM

[75] Inventor: Guy Immega, Vancouver, Canada

[73] Assignee: MacDonald Dettwiler and Associates Ltd., Richmond, Canada

[21] Appl. No.: 12,552

[22] Filed: Feb. 9, 1987

[51] Int. Cl.$^4$ .............................................. B60G 11/26
[52] U.S. Cl. ........................................ 280/711; 92/92; 267/64.23; 280/707
[58] Field of Search ................. 280/707, 711; 267/35, 267/64.23, 64.27, 148, 149; 92/90, 92

[56] References Cited

U.S. PATENT DOCUMENTS

| | | | |
|---|---|---|---|
| 2,844,126 | 7/1958 | Gaylord | 92/90 |
| 3,645,173 | 2/1972 | Yarlott | 92/92 |
| 4,468,050 | 8/1984 | Woods et al. | 280/707 |
| 4,595,072 | 6/1986 | Barnea | 280/707 |
| 4,600,215 | 7/1986 | Kuroki et al. | 280/707 |
| 4,615,260 | 10/1986 | Takagi et al. | 92/92 |
| 4,624,476 | 11/1986 | Tanaka et al. | 280/707 |
| 4,669,749 | 6/1987 | Tanaka et al. | 280/707 |
| 4,673,194 | 6/1987 | Sugasawa | 280/707 |

FOREIGN PATENT DOCUMENTS

WO84/02886 8/1984 World Int. Prop. O. .......... 280/707

Primary Examiner—Charles A. Marmor
Assistant Examiner—Ross Weaver
Attorney, Agent, or Firm—Christensen, O'Connor, Johnson & Kindness

[57] ABSTRACT

A tension actuator suspension system is disclosed, providing control over the elevation of a load suspended from a reference system, as well as over the compliance of the suspension system. As employed in a vehicle suspension system, a preferred arrangement employs radially expansible, axially contractible tension actuators exhibiting tensile forces that decrease nonlinearly as each contracts. An antagonistic actuator pair is arranged in opposition between the chassis and each wheel of the vehicle. Air is supplied to the actuators from a compressor and accumulator by lines under the control of pressure regulator valves. Manual or automatic inputs allow the adjustment of both vehicle chassis elevation and suspension system compliance individually with respect to each wheel. Furthermore, automatic sensors are provided to detect roll, pitch, steering angle, vehicle velocity, wheel traction, braking forces and bumps experienced by the chassis and a microprocessor responds by producing the appropriate suspension system response. Ranging sensors are further employed to provide anticipatory response of the system to upcoming road surface variations.

31 Claims, 8 Drawing Sheets

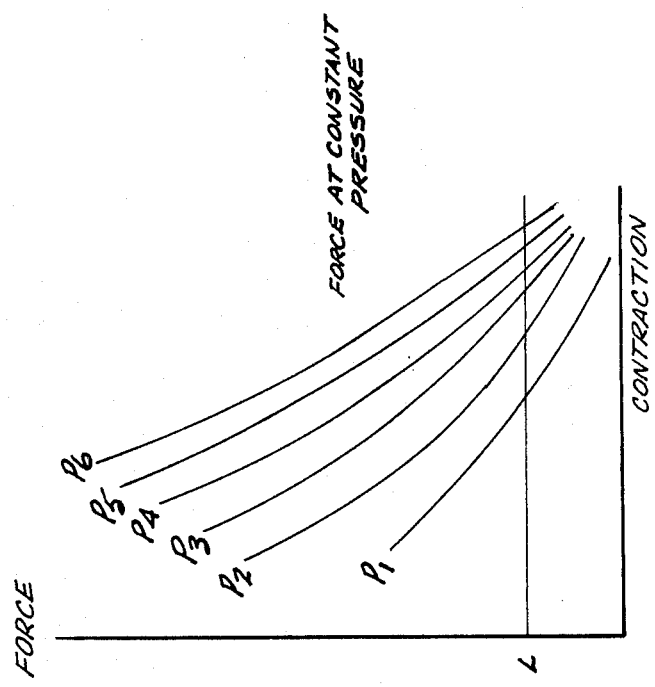
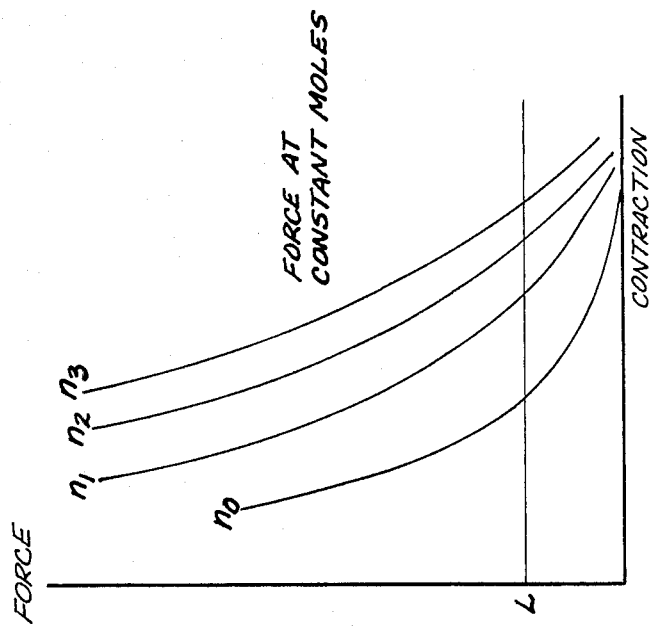

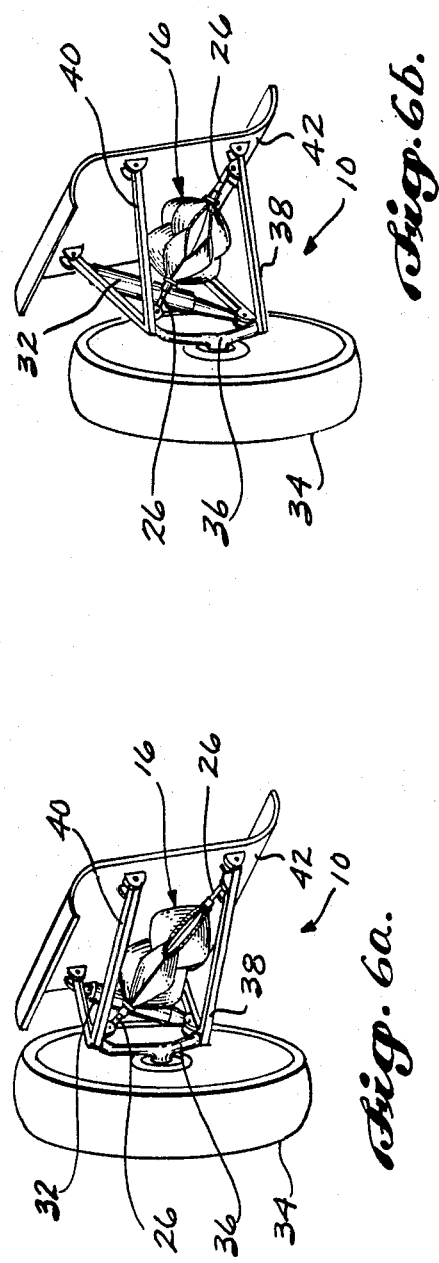
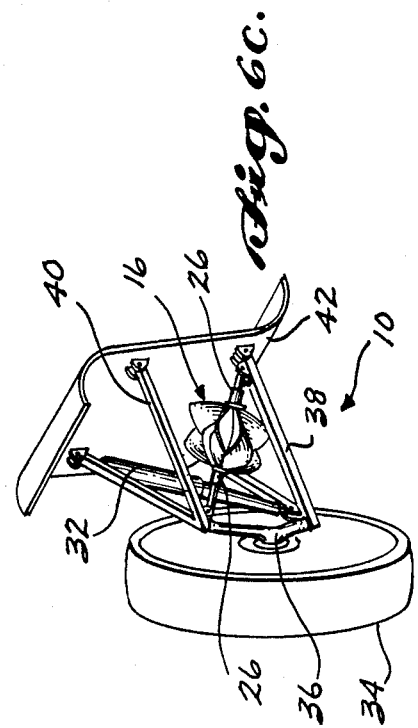

TENSION ACTUATOR LOAD SUSPENSION SYSTEM

FIELD OF THE INVENTION

This invention relates to suspension systems and, more particularly, to fluid-actuated suspension systems.

BACKGROUND OF THE INVENTION

For a variety of reasons, it is frequently desired to mechanically suspend or isolate one system from another. For example, the control circuitry regulating a large, industrial punch press may be adversely affected by vibration and shock introduced by the press if the circuitry is directly secured to the press' frame. By suspending the control circuitry in a manner designed to maintain its orientation substantially independently of the punch press' operation, the life of the circuitry may be extended and its proper operation assured.

An even more common example of the need to suspend and isolate one system from another is found in the automobile. There, it is desirable to suspend the chassis of the vehicle from the axles upon which the wheels of the vehicle ride. This not only increases passenger comfort by producing a smoother ride, but significantly enhances the mechanical life of the body and engine by reducing the mechanical shock and fatigue each is subjected to.

The problems such systems must resolve are numerous. For example, in the context of the automobile suspension system, the system may be required to suspend a wide variety of loads. With only the driver riding in the vehicle, the load applied to the suspension system is relatively small. On the other hand, if the driver is also transporting passengers and cargo, a substantially greater load is applied to the suspension system. The system must be able to compensate for such variations in loading or its ability to suspend and isolate the chassis will be impaired. More particularly, without some form of compensation, the driver of an otherwise empty automobile would most likely experience a rough ride in which relatively little movement of the chassis with respect to the wheels occurs. With the vehicle fully loaded, on the other hand, the uncompensated suspension system would produce a relatively soft ride in which the chassis undergoes significant displacements with respect to the wheels.

The disruptive influence of variable forces applied to the suspended load presents another problem that must be addressed by many suspension systems. For example, with a punch press operating at different cycle rates, control electronics suspended from the press may be subject to different frequencies of vibration. Similarly, an automobile traversing road discontinuities of varying separation may expose its chassis to a wide range of vibrational frequencies. The suspension systems employed in these applications should be able to compensate for the effect such variations have on the system to be suspended.

With respect to the automobile suspension system, road and driving conditions introduce additional forces with which the suspension system must contend. More particularly, during cornering of the vehicle, the chassis may be subject to forces normal to the direction of travel. These inertial cornering forces tend to alter the lateral orientation of the chassis with respect to the road surface, making it difficult for the passengers to comfortably maintain their seating. The suspension system should compensate for this roll or bank experienced by the chassis during cornering, thereby enhancing both passenger comfort and driver control of the vehicle.

Similarly, abrupt acceleration or deceleration of the vehicle may significantly affect the longitudinal orientation of the chassis with respect to the roadway. More particularly, during acceleration, the chassis may experience a condition known as squat, in which the forward portion of the chassis rises in relation to the rear portion of the chassis. During braking, on the other hand, a condition known as dive may occur, in which the front of the chassis drops with respect to the chassis rear.

To provide the desired isolation and suspension of one system with respect to another, a number of suspension systems have been designed having complexities that are somewhat proportional to the magnitude of the suspension problems presented. For example, in applications where the load is relatively insensitive to motion of the reference system from which it is suspended or where the load is subject to relatively few external forces, a simple vibration damper, such as a rubber pad, may be employed. The function of the damper is to absorb energy that would otherwise be transferred between the load and the reference system. While this manner of suspension has the obvious advantages of being relatively simple and inexpensive, its use, as noted above, it primiarly limited to applications where the reference system has relatively uniform operating characteristics and the suspended load requires relatively little isolation.

A slightly more sophisticated suspension system includes a spring added between the load and the reference systems. The spring stores energy that might otherwise be transferred between the load and the reference systems as the relative position of the two change. The stored energy may then either be released by a return of the load and reference systems to their original relative positions or be dissipated by the action of the damper. The precise manner in which this energy transfer occurs depends upon whether the response of the suspension system is overdamped, underdamped, or critically damped. In each instance, however, the suspension system reduces the energy transferred to the load, improving its isolation from the reference system. The spring constant of the spring, used to determine its operation in accordance the Hooke's law, may be either constant or nonuniform over the active operating length of the spring, depending upon the energy storage characteristics desired. This combined spring-and-damper arrangement provides slightly greater isolation of the load system from the reference system, particularly when more complex motion in the reference system is involved.

One common example of this elemental spring-damper suspension system is the standard automobile suspension system. Typically, automobile suspension systems including a spring and damper associated with each wheel. For example, the suspension associated with each front wheel may employ a relatively stiff cylindrical spring having a constant spring rate. The top of this spring is secured to a front cross member of the chassis and the bottom of the spring is attached to a lower control arm pivotally connected to the chassis. A shock absorber is generally located along the longitudinal axis of the spring and has its upper stem connected to the chassis and its lower stem fastened to the lower control arm. With this system employed, when the wheel traverses discontinuities or changes in the road surface, the force applied to the wheel develops potential energy in the spring rather than kinetic energy in the chassis, allowing the chassis to maintain its orientation with respect to the roadway. The damping effect of the shock absorber decreases the amount of potential energy originally stored in the spring and assists in its subsequent dissipation.

In rear wheel automobile suspension systems, a leaf spring having a nonuniform spring constant is often employed. The ends of the leaf spring are typically attached to the chassis and the center of the spring is secured to the rear axle housing. A rear shock absorber is also provided for each wheel, with the upper end of the shock absorber attached toward the center of the chassis to provide greater stability and the lower end attached to the rear axle housing.

While suspension systems that include both a spring and damper are typically more effective than systems employing only a damper, they may stil be inadequate when the load is subject to forces applied along more than one axis. For example, such a system may inadequately isolate the chassis of an automobile from movement of the wheels during cornering or sudden changes in acceleration or deceleration of the vehicle. To compensate for such phenomena, automobile suspension systems frequently include several additional components. For example, a stabilizer bar may connect the lower control arms to which the spring and shock absorbers of the left and right front wheel suspension systems are attached. This linkage of the two pivoting control arms reduces the tendency of the car to roll when cornering. Similarly, brake reactin rods may be provided, connecting the lower control arm of each front wheel suspension system to the automobile chassis. The function of the reaction rods is to maintain the position of the lower control arms with respect to the chassis, thereby resisting the tendency of the chassis to dive or squat when the automobile undergoes abrupt braking or acceleration.

While the stabilizer bar and reaction rods do reduce the affect of nonvertical forces applied to the chassis, they provide only limited relief. In addition, these elements do not provide the operator with control over the elevation of the chassis with respect to the wheels. The stablizer bar and reaction rods likewise do not offer the operator control over the relative compliance of the suspension system.

One arrangement intended to allow some control over the elevation of the chassis with respect to the wheels employs shock absorbers having a pressure tube that can be charged with varying volumes of air. With the vehicle subject to a particular passenger and cargo load, the elevation of the chassis with respect to the wheels is directly proportional to the volume of air provided to the shock absorbers. Such shock absorbers are commonly employed in rear suspension systems, which may undergo significant load variations. For example, when a vehicle is used to pull a relatively heavy trailer, the rear suspension system must support a substantial load that is not normally present. A rear suspension system unequipped to control chassis elevation would result in the rear of the chassis riding disproportionately low with respect to the forward portion of the chassis. By controlling the amount of air introduced into the shocks described above, however, a level ride can be produced under a wide variety of load conditions. While a suspension system employing such adjustable shock absorbers does provide the operator with some control over chassis elevation, the control typically is only exerted at specific occasions when the vehicle load is altered, rather than continuously while the vehicle is operating.

As an alternative to the foregoing arrangements, and a way of providing more continuous elevational control, air suspension systems have sometimes been employed. For example, in an automotive suspension system, such a system may include air spring units, elevational or leveling valves, a manual control valve, an air compressor, and an air storage tank or accumulator. Typically, an air spring unit includes an air chamber that is sealed on one end by a diaphragm and is fastened to the chassis of the car. A plunger is secured to the lower control arm and acts against the diaphragm, tending to collapse the diaphragm into the air chamber. Under a constant vehicle load, when additional air is pumped into the chamber the action of the diaphragm against the plunger causes the elevation of the chassis to increase. As air is removed from the chamber, the plunger collapses the diaphragm further into the chamber, decreasing the elevation of the chassis.

Automatic elevational control is provided by leveling valves secured to the front and rear of the chassis. These valves are mechanically actuated by elements that indicate the relative position of the chassis with respect to the wheels and that automatically trigger the leveling valves when variations in vehicle loading are experienced. Thus, as the locations of the position-indicating elements change in response to loading variations, the links between the elements and the leveling valves cause the valves to adjust the air supplied to the chambers until the original positions of the elements are restored. A manual control valve also allows the air supplied to the air spring units to be regulated and, with the control valve located inside the car, the driver can adjust the elevation of the chassis during operation of the vehicle. In either case, the pressurized air required for operation of the system is obtained from an accumulator tank charged by a belt-driven air compressor.

While the air suspension system described above does allow somewhat continuous elevational control of the chassis to be maintained, it suffers from several shortcomings. For example, the system provides relatively little control over compliance, has a relatively slow response time, and has a limited ability to accurately position the chassis with respect to the wheels.

To overcome the various problems involved in the suspension and isolation of one system from another, a suspension system should offer control over the elevation or displacement of the load system, as well as control over the compliance of the suspension. Elevation and compliance should be controllable in response to both manual inputs and automatically sensed operational changes. The response to such inputs and changes should also be both quick and accurate. Finally, the suspension system should be relatively lightweight and simple.

SUMMARY OF THE INVENTION

In accordance with this invention, a system is provided for suspending a load from at least one reference frame. The system includes a fluid responsive, radially expansible, axially contractible actuator for applying a tensile force between the load and reference frame that decreases as the actuator contracts. A fluid source is connected to the actuator and supplies fluid to the actuator. The fluid causes the actuator to contract. Control means controls the supply of fluid from the fluid source to the actuator. In one embodiment, a pair of antagonistic, fluid responsive, radially expansible, axially contractible actuators apply antagonistic tensile forces between the load and separate points on a reference frame or separate reference frames.

Also, in accordance with this invention, a vehicle suspension system is provided for suspending the chassis of a vehicle from the support structure associated with each of its wheels. The system includes a separate fluid responsive, radially expansible, axially contractible actuator connected between the support structure associated with each wheel and the chassis. A fluid source supplies fluid to each of the separate actuators, and separate valves, connected between the fluid source and each actuator, control the supply of fluid from the source to the actuators. The fluid supplied to the actuators causes them to contract axially. The system also includes pressure transducers that produce outputs indicative of the pressure of the fluid within each actuator. Chassis position sensors produce outputs indicative of the relative position of the chassis with respect either to the support structure associated with each wheel or to the road. A processor receives the outputs of the pressure transducers and chassis position sensors and produces control signals in response thereto. The control signals are provided to the valves to control both the flow and pressure of fluid supplied to each actuator. In one embodiment of the vehicle suspension system, a pair of fluid responsive, radially expansible, axially contractible actuators apply antagonistic tensile forces between the chassis and the support structure associated with their corresponding wheel.

BRIEF DESCRIPTION OF THE DRAWINGS

The invention will presently be described in greater detail, by way of example, with reference to the accompanying drawings, wherein:

FIG. 4 depicts the tensile force developed by the actuator of FIGS. 2 and 3 as a function of contraction, when various different numbers of moles of fluid are introduced and held in the actuator;

FIG. 5 depicts the tensile force developed by the actuator of FIGS. 2 and 3 as a function of contraction, for a number of different internal actuator pressures;

FIGS. 6a, 6b and 6c illustrate an examplary suspension system constructed in accordance with this invention and employing a single tension actuator;

DETAILED DESCRIPTION OF THE PREFERRED EMBODIMENT OF THE INVENTION

Figure 1:
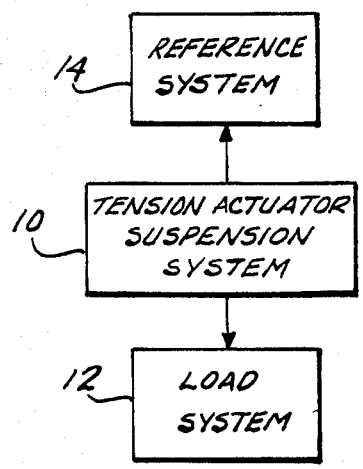
FIG. 1 is a schematic diagram of a suspension system, suspending a load system in tension from a reference system.

As shown in the block diagram of FIG. 1, a tension-actuator suspension system 10, constructed in accordance with this invention, suspends a load system 12 from a reference system 14. In addition to providing a desired physical displacement between load system 12 and reference system 14, suspension system 10 is capable of reducing the influence that forces applied to one system have on the other. More particularly, suspension system 10 may be called upon to limit the influence of reference system forces on the load system 12. Suspension system 10 may also be required to isolate reference system 14 from the forces exerted on the load system 12. As will be discussed in greater detail below, suspension system 10 provides the desired suspension characteristics by controlling the displacement of the load and reference systems 12 and 14, as well as the compliance of the suspension system 10, in response to the forces exerted on systems 12 and 14.

Figure 2:
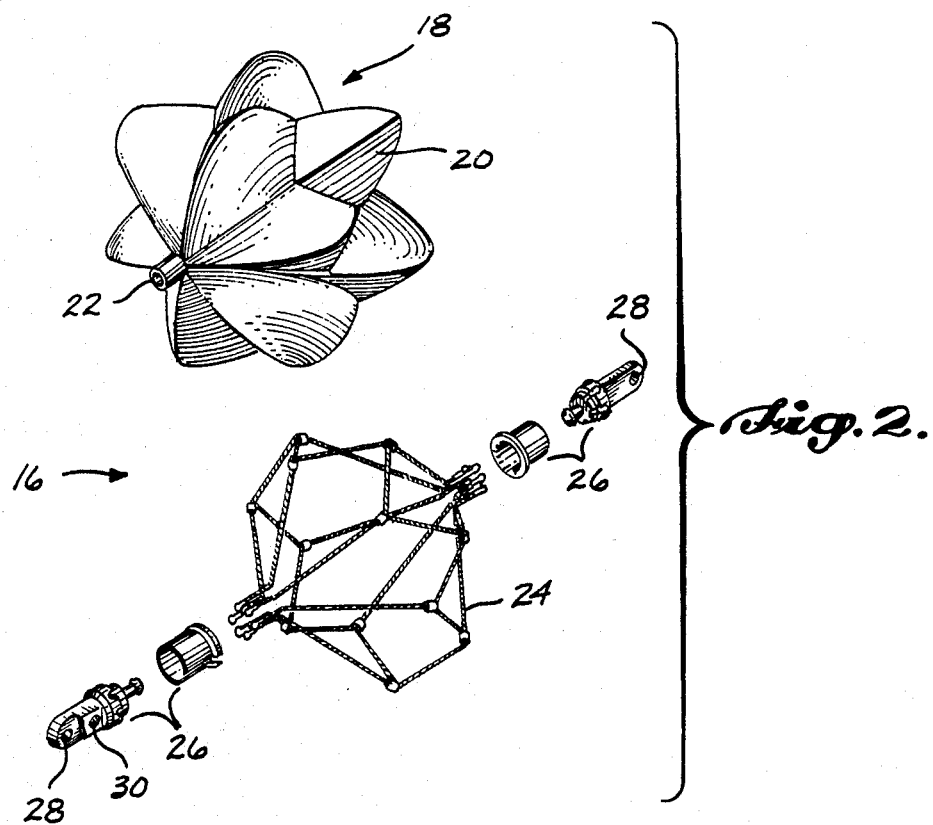
FIG. 2 is an exploded view of a tension actuator constructed for use with the suspension system of this invention.

The basic component of suspension system 10 is a tension actuator 16, one embodiment of which is shown in FIG. 2. The body of actuator 16 is defined by an inflatable hollow enclosure 18 having a plurality of articulable, radially protruding segments 20 and two cylindrical end pieces 22. Enclosure 18 is made of a relatively thin, fluid impermeable, substantially inelastic material. An optional network 24 of substantially inextensible, linked cables surrounds enclosure 18, with the individual cables in network 24 being positioned along the valley folds between adjacent protruding segments 20. Network 24 is secured to each end piece 22 of enclosure 18 by an end connector 26. The connectors 26 seal the ends of enclosure 18 and include transverse mounting holes 28 that allow one end of tension actuator 16 to be connected to load system 12 and the other end to be secured to reference system 14. At least one of the end connectors 26 also includes a port 30 through which a fluid, preferably air, can be introduced into enclosure 18.

Figure 3A:
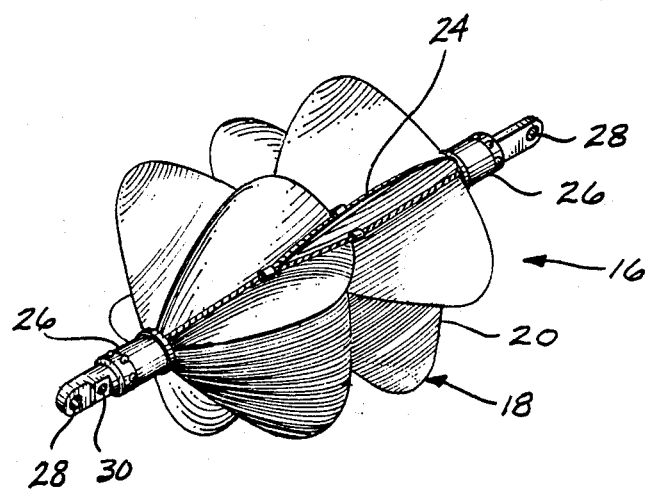
FIGS. 3a and 3b illustrate the assembled actuator of FIG. 2 in contracted and uncontracted states.
Figure 3B:
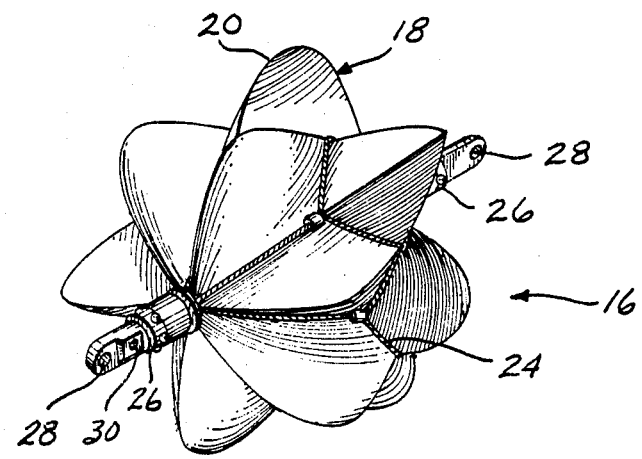

The operation of tension actuator 16 will now be discussed in greater detail with reference to FIGS. 3a and 3b. As shown in FIG. 3a, actuator 16 is in its uncontracted or fully extended state. This condition typically exists when a tensile load is applied to actuator 16 and the interior of enclosure 18 is vented to the environment of the actuator. Under these circumstances, the fluidic pressure within enclosure 18 is insufficient to inflate actuator 16 and the tensile load applied to actuator 16 keeps the protruding segments 20 drawn closed into relatively flat radial projections.

When the internal pressure of enclosure 18 is increased by the introduction of, for example, pressurized air, the protruding segments 20 are forced to articulate, expanding radially outward and contracting enclosure 18 axially. As will be readily appreciated from FIGS. 3a and 3b, the arrangement of network 24 against enclosure 18 causes the axial contraction of the protruding segments 20 to be transferred to network 24. Thus, the tensile force applied between the load system 12 and reference system 14 via end connectors 26 is provided both by enclosure 18 and network 24. Because enclosure 18 and network 24 are made of substantially inelastic and inextensible materials, their cooperative action does not introduce sliding friction that might decrease the life of actuator 16.

As will be discussed in greater detail below, the supply of fluid to actuator 16 may be achieved in either a relatively passive or active manner. For example, actuator 16 can be operated passively by introducing a predetermined number of moles of fluid into enclosure 18 and then closing port 30. In this mode of operation, the application of a tensile load to actuator 16 can only result in axial extension if enclosure 18 compresses the fluid within actuator 16. Thus, as will be appreciated, the passively operated actuator 16 exhibits a spring-like resistance to such tensile loading.

FIG. 4 is a family of curves depicting the force of resistance to tensile loading produced by actuator 16 as a function of actuator contraction, when various predetermined moles of fluid are introduced into enclosure 18. As clearly illustrated, the tensile force developed by actuator 16, with a given number of moles of fluid maintained therein, is greatest when the actuator is in its fully extended position. As actuator 16 contracts, the tensile force developed by the actuator decreases in a nonlinear fashion. This nonlinear variation in tensile force is due primarily to the geometry of enclosure 18. More particularly, the fluid within enclosure 18 exerts internal forces on enclosure 18 that are transmitted through enclosure 18 and network 24 to develop the tensile resistive force experienced between reference system 14 and the load 12. As will be appreciated, the magnitude of these tensile resistive forces is at a maximum when actuator 16 is substantially entirely extended and is at a minimum when actuator 16 is substantially entirely contracted. Between these limits of axial extension, the geometry of enclosure 18 results in a nonlinear decrease in the magnitude of the resistive force produced by the decreasing fluid pressure of the constant molar volume within enclosure 18 as actuator 16 contracts.

As shown in FIG. 4, the portion of each curve corresponding to the initial contraction of actuator 16 from its fully extended condition has a slope that is relatively large in magnitude. The region of the curve depicting operation of actuator 16 near full contraction, however, has a relatively small slope. Because the slope of the curve indicates the change in actuator force produced by a corresponding change in contraction, it represents the spring constant of actuator 16. Thus, actuator 16 can be operated as a spring that has a variable spring constant, rendering actuator 16 relatively stiff when extended and relatively soft when contracted. With compliance used to denote the relative stiffness of actuator 16, this aspect of actuator 16 operation renders controlled actuator compliance possible. It should benoted, however, that, with a fixed number of moles of fluid contained in enclosure 18, the volumetric changes in enclosure 18 caused by extension and contraction of actuator 16 also alter the fluid pressure within enclosure 18.

FIG. 4 clearly illustrates the effect that variations in the number of moles of fluid within enclosure 18 have on actuator 16 operation. More particularly, the contraction and force of actuator 16 exhibited under a particular tensile load varies directly with the number of moles of fluid contained therein. As shown in FIG. 4, the operation of actuator 16 under a given load L could therefore be actively controlled between a plurality of curves $n_0$, $n_1$, $n_2$ and $n_3$, having various slopes, by altering the number of moles of fluid contained within actuator 16. While this manner of "active" operation would allow some control over the compliance of actuator 16 operation, it may be difficult to control the number of moles of fluid within actuator 16 with the precision necessary to produce the desired change in compliance.

An easier method of actively controlling the operation of actuator 16 involves the application of fluid at constant pressure to enclosure 18. With the fluid pressure established at some predetermined constant value, the application of a tensile load to actuator 16 must expel fluid, thus reducing the number of moles of fluid within enclosure 18, if actuator 16 is to extend axially. Therefore, actuator 16 exhibits a spring-like resistance to the tensile load.

FIG. 5 is a family of curves depicting the force of resistance to tensile loading produced by actuator 16 as a function of actuator contraction, when fluid at various constant pressures is introduced into enclosure 18. As clearly illustrated, the general response of actuator 16 when supplied with fluid at constant pressure resembles the response resulting from the maintenance of a uniform number of moles of fluid within enclosure 18. One significant difference between the constant force curves of FIG. 5 and the constant mole curves of FIG. 4, however, is the variation in curve slope exhibited over the range of actuator 16 contraction. More particularly, the constant pressure curves have a smaller range of slope variation.

Unlike the number of moles of fluid within enclosure 18, the pressure of the fluid applied to actuator 16 can be precisely controlled in a relatively easy manner. FIG. 5 illustrates the effect of pressure variations within enclosure 18 for consecutively increasing pressures $P_1$, $P_2$, $P_3$, $P_4$, $P_5$, and $P_6$. As will be appreciated, if a fixed load is to be susupended by actuator 16, the constraction of the actuator varies directly with the internal pressure of enclosure 18. Thus, the operating point of actuator 16 with respect to the various curves shown in FIG. 5 can be moved horizontally, from one curve to the next, simply by altering the fluid pressure applied to enclosure 18. Because the slopes of the force curves at the various operating points corresponding to a particular force level also vary directly with pressure, some control over the compliance of actuator 16 is available by varying the pressure within enclosure 18. For example, with actuator 16 supporting load L, operation at pressure $P_5$ involves a region of the $P_5$ curve that has a high slope. If the pressure is reduced to $P_1$, however, operation is along a portion of the $P_1$ curve that has a much lower slope. It should be noted, however, that such control necessarily involves operation of actuator 16 at various degrees of contraction.

As will be discussed in greater detail below, in practice, the operation of actuator 16 is likely to involve a combination of the passive and active modes describd above. For example, when used in an automobile suspension system, actuator 16 may normally be passively controlled for uniform operation when the vehicle is traveling at highway speeds. Then, when the vehicle is called upon to perform more complicated maneuvers or when it encounters rough terrain at lower speeds, the operation of actuator 16 may be advantageously switched between the passive and active modes described above.

While tension actuator 16 is preferably constructed as described above and illustrated in FIGS. 2 and 3, other arrangements can be employed. For example, suitable tension actuators are described in complete detail in U.S. Pat. Nos. 2,483,088 (DeHaven), 2,844,126 (Gaylord), and 3,645,173 (Yarlott), expressly incorporated by reference herein. These actuators, however, typically do not achieve the same levels of contraction and tensile force produced by the tension actuator 16 depicted in FIGS. 2 and 3. More particularly, the protruding segments 20 of enclosure 18 significantly enhance the ability of actuator 16 to axially contract and volumetrically expand. In addition, because the work done by actuator 16 equals the pressure within enclosure 18 multiplied by the total change in volume inside enclosure 18, the tensile force exhibited by actuator 16 is directly related to the volumetric expansion of the enclosure 18. The actuator 16 depicted in FIGS. 2 and 3 is also preferred as being less susceptible to friction-induced wear and hysteresis than the actuators disclosed in the reference patents.

FIG. 6 is a simplified illustration of an actuator 16 employed in a suspension system constructed in accordance with this invention. As will be appreciated, a suspension system that includes an actuator 16 has a variety of applications. For example, the system could be used to isolate the turret of a tank from road vibration while maintaining its orientation with respect to some target. Similarly, the system could be used to support a ship's crane to reduce the transmission of wave-induced motion from the ship to the crane.

The particular application of the system depicted in FIG. 6 is that of an automobile suspension system. While a similar system would be employed for each wheel, for convenience only one is shown in FIG. 6. Ignoring, for the moment, the influence of shock absorber 32, the operation of the tension actuator 16 as a suspension spring will now be discussed. As shown in FIG. 6a, a wheel 34 suspended by a parallelogram suspension arrangement is connected by a steering knuckle 36 to upper and lower, V-shaped control arms 38 and 40 that are pivotally secured to chassis 42 of the automobile. One end connector 26 of tension actuator 16 is connected to the upper control arm 40 adjacent the steering knuckle 36. The other end connector 26 of actuator 16 is connected to the chassis 42 at a point adjacent one of the pivotal connections of the lower control arm 38 to chassis 42. The connection of wheel 34 to the upper and lower pivotal control arms 40 and 38, through steering kuckle 34, allows wheel 34 to undergo motion having a component that is vertical with respect to chassis 42. Thus, gas pressurized air is supplied to enclosure 18 and the tension actuator 16 contracts to the position shown in FIG. 6b, the chassis 42 lifts with respect to wheel 34. Chassis 42 can be further lifted, as shown in FIG. 6c, by the additional contraction of tension actuator 16 induced at greater air pressure. To reverse the process, air is vented from enclosure 18, allowing tension actuator 16 to extend and the position of chassis 42 to drop with respect to wheel 34.

To damp the response of the suspension system 10 of FIG. 6 to, for example, high-frequency discontinuities in the road surface, a shock absorber 32 is added having a first end connected to the portion of the lower control arm 38 adjacent the steering knuckle 36. The other end is then attached to chassis 42 adjacent a pivot point of the upper control arm 40. In this configuration, shock absorber 32 opposes the downward motion of chassis 42 with respect to wheel 34. Thus, shocker absorber 32 dampens the transmission of road shock from wheel 34 through the suspension system 10 to chassis 42. A conventional spring can also be added in parallel with shock absorber 32, in the embodiment shown in FIG. 6, to passively augment actuator 16 and to limit the extent of excursion of the suspension system.

A suspension system 10 constructed in the manner described above has a number of advantages. For example, the use of tension actuator 16 allows suspension system 10 to produce a relatively large amount of force for its weight. In addition, the actuator 16 responds quickly to pressure variations produced in enclosure 18, allowing system 10 to be rapidly adjusted by a control system as discussed in greater detail below.

Figure 7:
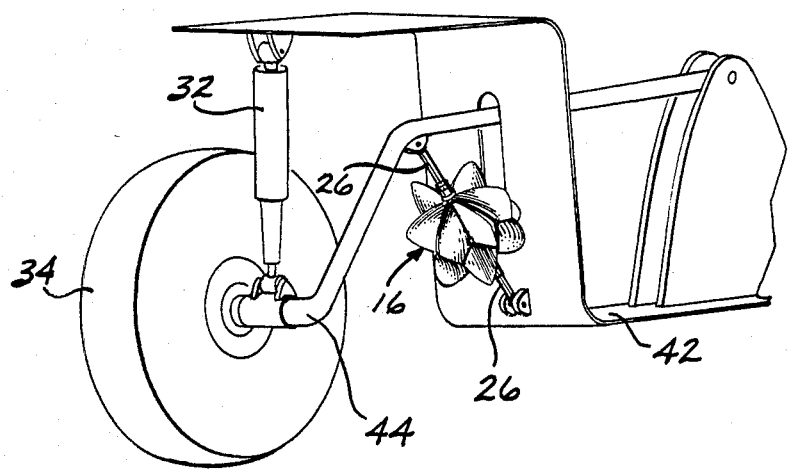
FIG. 7 illustrates an alternative suspension system employing a single tension actuator.

An alternative single actuator automobile suspension system 10, for use primarily with the rear wheels, is shown in FIG. 7. This system differs from the parallelogram suspension system 10 shown in FIG. 6 by employing a single swing arm 44 upon which wheel 34 is mounted. As shown, the end of swing arm 44 opposite wheel 34 is pivotally secured to chassis 42 at a point above the axis of wheel 34. This pivotal connection allows swing arm 44 to undergo limited rotational motion in a substantially vertical plane. One end connector 26 of actuator 16 is connected to swing arm 44 midway between wheel 34 and chassis 42, while the other end connector 26 is attached to chassis 42 well below the point of swing arm 44 attachment.

As with the parallelogram arrangement illustrated in FIG. 6, the contraction of actuator 16 in the swing-arm arrangement lifts chassis 42 with respect to wheel 34. Shock absorber 32 has one end attached to swing arm 44 adjacent wheel 34 and the other end attached to a point on chassis 42 located above wheel 34. A conventional spring can also be added in parallel with shock absorber 32, in the embodiment shown in FIG. 7, to passively augment actuator 16 and to limit the extent of excursion of the suspension system. The operating characteristics of the swing-arm suspension system are substantially the same as those described with respect to the parallelogram system and, therefore, are not discussed here. As will be readily appreciated, other single tension actuator systems, for use in automotive and other applications, can be produced in accordance with this invention by one of ordinary skill given the discussion of such systems provided above.

In a more sophisticated tension-actuator suspension system, two antagonistic tension actuators 16 are employed. The two-actuator system is based upon applicant's finding that a tension actuator 16, when stretched and simultaneously vented at a controlled rate, exhibits a damping chracteristic that can be dynamically altered. Thus, the shock absorber 32 depicted in, for example, FIG. 6, can be replaced by a second tension actuator 46 to produce the two actuator system shown in FIG. 8. As will be appreciated, actuator 46 can also be controlled to operate in substantially the same manner as, but in opposite to, actuator 16.

Figure 9:
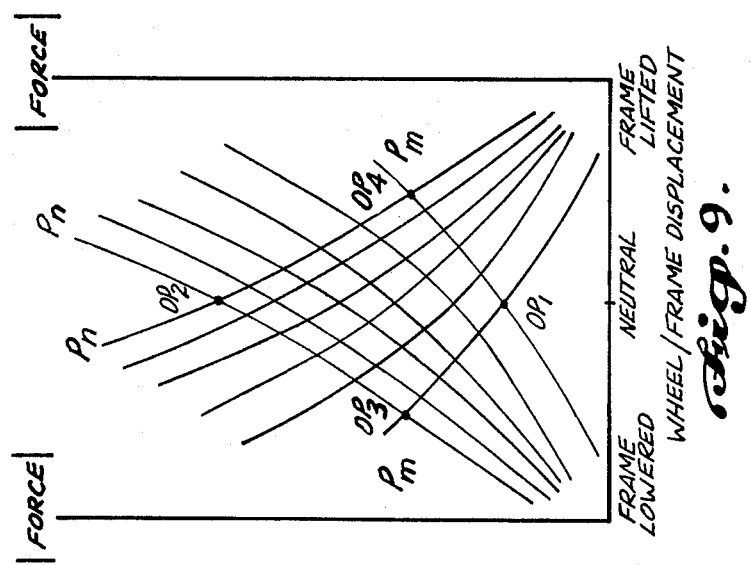
FIG. 9 is a graph illustrating the force applied to a load by a pair of opposing tension actuators, as a function of load movement with respect to the reference system, for a number of different actuator pressures.
Figure 10:
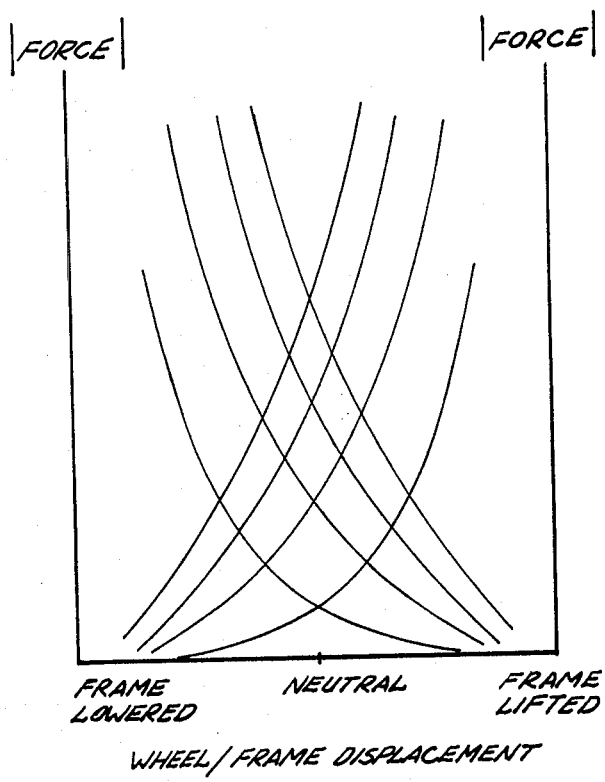
FIG. 10 is a graph illustrating the force applied to a load by a pair of opposing tension actuators, as a function of load movement with respect to the reference system, for a number of different moles of fluid supplied to the actuators.

In construction and basic operational characteristics, actuators 16 and 46 are substantially identical, although actuators of different sizes could be employed. Temporarily ignoring the weight of chassis 42 to be lifted by the suspension system 10, the absolute value of the force developed by each of the two actuators 16 and 46 as a function of wheel or chassis displacement and pressure, is shown in FIG. 9. With actuators 16 and 46 passively operated by maintaining predetermined numbers of moles of fluid in actuators 16 and 46, the absolute value of the force developed by each of the actuators as a function of wheel or chassis displacement and the number of moles is shown in FIG. 10. The force curves of FIG. 10 are similar to those of FIG. 9 but have a slightly greater range of slopes. As will be appreciated, it is also possible to apply constant pressure to one of the actuators and a constant number of moles to the other. In that case, the resultant force curves would be a combination of the curves illustrated in FIGS. 4 and 5. Because the two-actuator system is particularly useful in actively controlling compliance and chassis elevation, however, the following discussion primarily refers to the force curves of FIG. 9, which depend upon the more easily controlled variable of actuator pressure.

As shown in FIG. 9, the magnitude of the force curves representing operation of tension actuator 16 decreases as actuator 16 contracts, lifting chassis 42 with respect to wheel 34. Similarly, the magnitude of the force curves representing operation of tension actuator 46 declines as actuator 46 contracts. The contraction of actuator 46, however, corresponds to a drop in the elevation of chassis 42 with respect to wheel 34. Thus, because one actuator extends while the other contracts, plotting the operation of both actuators 16 and 46 on the same graph results in the plurality of intersecting force curves depicted in FIG. 9. The various intersections of these curves represent operating points of the system that can be produced by supplying the appropriate pressure to each actuator. The contraction of actuators 16 and 46, as well as the tensile response of each, can then be determined from the horizontal and vertical axes respectively.

Assuming that the mechanical linkages between wheel 34 and chassis 42 are symmetric for both actuators 16 and 46, the contraction of each actuator is the same and the tensile force that can be withstood by each is equivalent, if each of the enclosures 18 of the two actuators are supplied with air at the same pressure. Thus, regardless of the magnitude of the commonly supplied pressure, the relative position of chassis 42 with respect to wheel 34 remains at a constant, "neutral" position midway between its greatest extends of travel. If a relatively low common pressure, for example, $P_m$, is selected to maintain the neutral position, the operating point of the system is located at a point $OP_1$ on the force curves where the magnitude of the slope of each curve is relatively low. Thus, even slight variations in the forces applied to the system will produce relatively large system displacements indicating of soft suspension system. On the other hand, if a relatively high common pressure, for example, $P_n$, is applied to each enclosure 18, the slopes of the intersecting curves at the new operating point $OP_2$ have a relatively high magnitude at the neutral position and a stiff suspension results. In this manner, a relatively large variation in suspension system 10 compliance can be achieved while maintaining the same neutral elevation of chassis 42, simply by adjusting the air pressure concurrently provided to each actuator.

With a single actuator, any control over system compliance is achieved at the expense of variations in position. In many systems, it would be desirable to control compliance while both the load and elevation are maintained constant. Unlike the single tension actuator suspension system, with two tension actuators employed both compliance and elevation can be controlled independently of the external loads applied to the system. Active control over the position of chassis 42 with respect to wheel 34 can be produced by altering the pressure of the air supplied to one or the other or both of the actuators 16 and 46. For example, with air provided to actuator 46 at a relatively high pressure, $P_n$, and to actuator 16 at a relatively low pressure, $P_m$, the operating point of the system is at $OP_3$ and chassis 42 is lowered below its neutral position. On the other hand, if the air pressure in actuator 16 is increased to $P_n$ and the air pressure in actuator 46 decreased to $P_m$, the operating point of the system is at $OP_4$ and chassis 42 is lifted above its neutral position. With the desired location of chassis 42 with respect to wheel 34 obtained, the compliance of system 10 can then be adjusted by maintaining the same ratio between the pressure in actuators 16 and 46, while adjusting the magnitude of the air pressure in each actuator.

It should be noted, however, that in the duel actuator system, system compliance is a referential concept determined by the slope of the force curve for each actuator at the operating point and dependent upon which of the two actuators is undergoing tensile loading. More particularly, in the arrangement of FIG. 8, actuator 16 exhibits a first level of resistance to additional loading of chassis 42, while actuator 36 exhibits a second level of resistance to forces that tend to lift chassis 42. Each of these levels of resistance is determined from the slope of the corresponding actuator's force curve at the operating point involved. Although the levels of resistance exhibited by each actuator may not be equal, for convenience they may be jointly referred to as defining the compliance of the system.

It should also be noted that the relatively sharp intersection of the curves illustrated in FIG. 9 allows the position of chassis 42 with respect to wheel 34 to be relatively precisely controlled. More particularly, with enclosures 18 designed to produce forces responses having relatively moderate slopes throughout, the curves will intersect at angles having limited deviations from 90 degrees. As a result, in contrast to the control available from piston-and-cylinder adjusted suspension systems, the location of wheel 34 with respect to chassis 42 will be maitained even when the system is subject to relatively large force variations.

Figure 8:
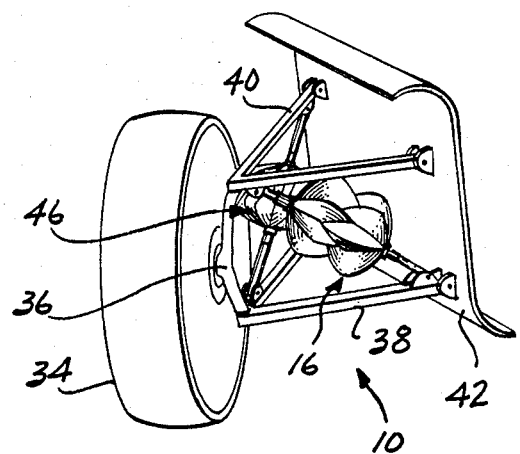
FIG. 8 illustrates a suspension system constructed in accordance with this invention and employing a pair of opposing tension actuators.
Figure 11:
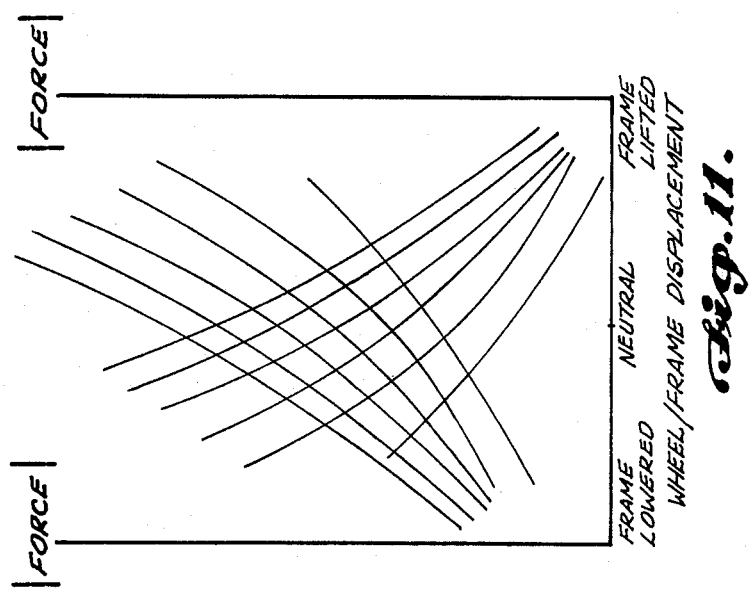
FIG. 11 is a graph depicting the influence of the load on the force curves of FIG. 9; and, FIG. 12 is a block diagram of a complete automobile suspension system constructed in accordance with this invention and including manual and automatic sensor inputs to which a microcomputer responds.

The effect of loading on the active operation of the system discussed in conjunction with FIGS. 8 and 9 will now be considered in greater detail. As shown in FIG. 9, the absolute value of the forces developed by actuators 16 and 46 are plotted. Because of the orientation of the two actuators, however, their forces are oppositely directed and they operate antagonistically. Assuming that the portion of chassis 42 load to be lifted by tension actuator 16 is L, actuator 16 must be able to counteract not only the force of tension actuator 46 but that of load L as well. Thus, if the system response of FIG. 9 is to be compensated for the effect of chassis load L, the force response curves corresponding to actuator 46 must be increased in magnitude by the amount L. This corrected system response is shown in FIG. 11.

As clearly illustrated by the corrected response curves, the potential operating range of actuator 16 is effectively shifted upward along the force curves and the slope of the actuator 16 force curve at a particular operating point is significantly increased. Thus, as the magnitude of load L increases, more shifting will be produced and the operation of actuator 16 will become less compliant. An additional factor to be noted is that, if actuators 16 and 46 are to be equally contracted with the system supporting the load L of chassis 42, slightly different pressures must be applied to their respective enclosures 18. With equal pressure applied to each enclosure 18, the influence of load L will cause actuator 16 to extend more than actuator 46 and chassis 42 will be suspended below is neutral position with respect to wheel 34.

As noted previously, the foregoing discussion of system operation also applies when the number of moles of fluid within actuators 16 and 46, rather than fluid pressure, are controlled. Because pressure can be continuously adjusted more easily than the number of moles of fluid within actuators 16 and 46, however, active system control is conveniently pressure dependent. Passive control of the number of moles of fluid within actuators 16 and 46, on the other hand, can be achieved by introducing a given number of moles into the actuator and either sealing the actuator or controllably venting it, depending upon whether actuator is desired to operate like a spring or shock absorber, respectively.

As noted previously, the arrangement shown in FIG. 8 has the advantage of providing relatively precise control over the position of load 42 with respect to wheel 34. In addition, the use of opposing tension actuators 16 and 46 allows the compliance of the suspension of load 42 to be independent of the position of load 42. Because a pneumatic pressure tank can store energy which can be rapidly released, position control of load 42 can be achieved quickly in response to the control inputs. Because actuators 16 and 46 are capable of producing a relatively large tensile force for their weight, the suspension system also has the advantage of being relatively lightweight.

As will be appreciated, the foregoing advantages are provided by other embodiments of a dual actuator suspension system constructed in accordance with this invention. For example, the shock absorber 32 illustrated in the swing arm suspension system of FIG. 7 could be replaced by a second tension actuator to operate in substantially the same manner as described in conjunction with FIGS. 8 through 11. While the second actuator could be vertically connected to chassis 42, it is also possible that the second actuator would be nonvertically oriented in opposition to actuator 16 so as to obtain more displacement of the suspension system when the actuator contracts.

Having reviewed the operation of basic suspension systems constructed in accordance with this invention, a broader system incorporating such single and dual tension actuator suspension systems will now be described in conjunction with FIG. 12. As shown, the system of FIG. 12 includes four separate suspension subsystems 48, which may be of the single or dual actuator type described above, commonly operated to form, for example, a complete automobile suspension system 50.

Figure 12:
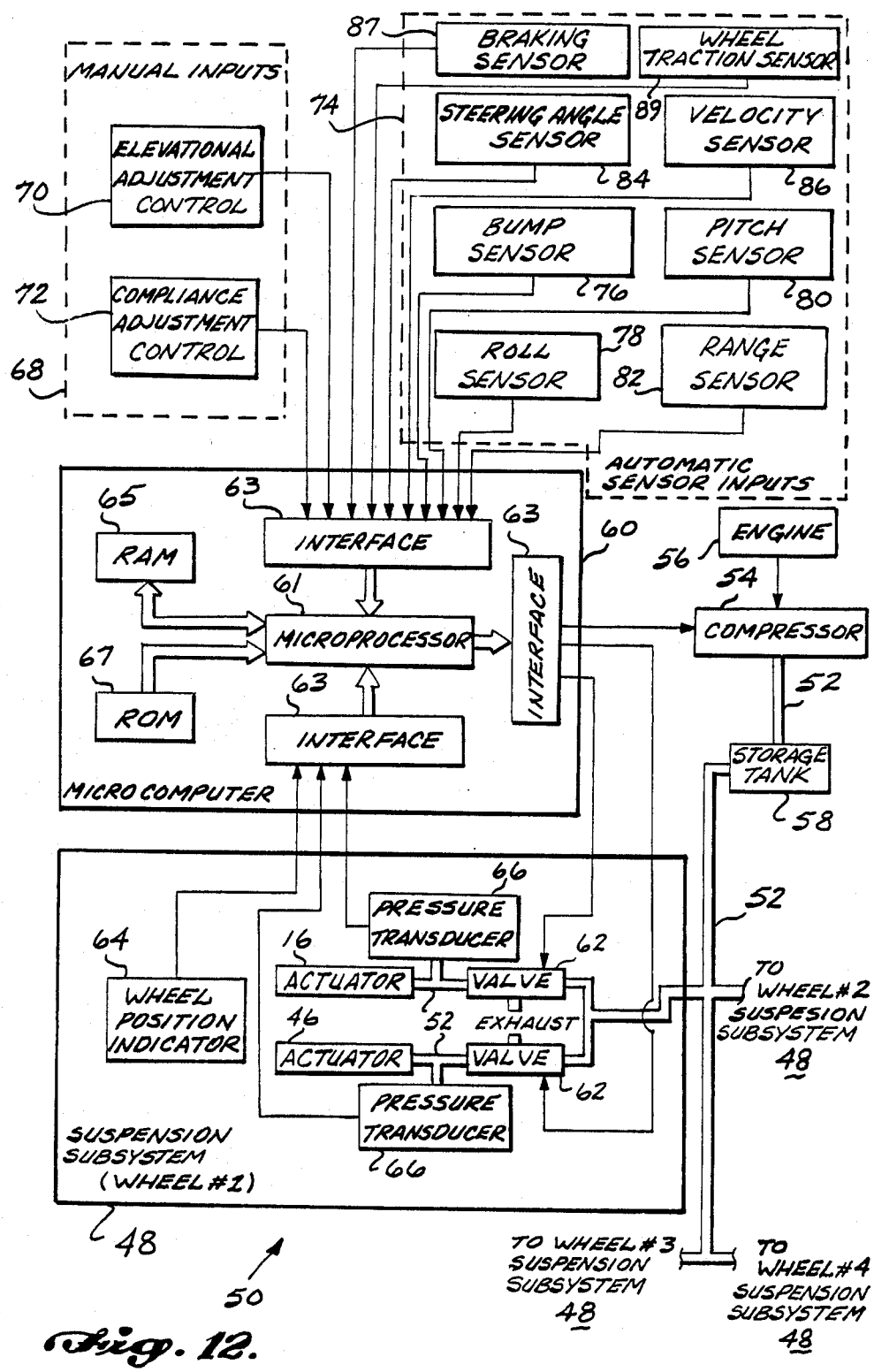

As shown in the dual tension actuator suspension subsystem 48 of FIG. 12, tension actuators 16 and 46 are supplied with air through an air line 52. Air provides a suitable actuating fluid for a number of reasons. First, a ready supply of air is typically available from the environment of the suspension system. In addition, the pressure of air can be controlled relatively easily and inexpensively. Air also can be used to operate the system at relatively low pressures.

The air compressor 54 is typically belt-driven by automobile engine 56 and receives a clean unpressurized supply of air via the air-breather filter of engine 56. Compressor 54 responds by supplying air at a predetermined pressure to a storage tank or accumulator 58. For example, compressor 54 may generally maintain the pressure within storage tank 58 at approximately 250 lb/in$^2$ ($1.7 \times 10^6$Pa). Alternatively, compressor 54 may be used to directly control the pressure of the air supplied to the actuators. An automatic shutoff valve is typically provided on compressor 54 to halt operation when the pressure in accumulator 58 equals the predetermined safety limit of the accumulator 58.

The function of accumulator 58 is to store a predetermined volume of the pressurized air received from compressor 54 for subsequent use by suspension subsystems 48. This allows compressor 54 to be run at a lower-duty cycle and results in more efficient system operation. The volume of air stored by accumulator 58 must be sufficient to allow the subsystems 48 to adjust automobile elevation and suspension compliance in response to operator requests and the commands of various automatic sensors discussed in greater detail below. For example, a tank capacity of approximately 144 in$^3$ (2360 cm$^3$) should be sufficient when charged with air at approximately 150 lb/in$^2$ ($1.0 \times 10^6$Pa). Accumulator 58 is generally equipped with a high-pressure relief valve to reduce the pressure within accumulator 58 should that pressure exceed the normal safe operating pressure of accumulator 58. A check-valve, located between compressor 54 and accumulator 58, may be employed to prevent pressurized air within accumulator 58 from escaping to compressor 54 when the compressor 54 is not running.

As shown in FIG. 12, the air line 52 connects compressor 54 with accumulator 58 and supplies pressurized air from accumulator 58 to each of the suspension subsystems 48. Alternatively, smaller accumulators may be placed near each suspension subsystem 48 in order to improve speed of operation. Air line 52 may be made of a variety of materials including, for example, metal, plastic, or rubber tubing, or combinations of the three. Appropriately configured attachment fittings connect air line 52 to the various components of system 50.

Turning now to the manner in which the various subsystems 48 of system 50 are controlled, input information concerning the status of system 50 and subsystems 48 is provided to a microcomputer 60 which produces control signals that are applied to the subsystems 48. Before discussing the various inputs and the manner in which they are analyzed by microcomputer 60, however, a brief discussion of the responding elements of subsystems 48 is provided. More particularly, the flow of air from accumulator 58 to each suspension subsystem 48 is controlled by at least one air regulation valve 62. For example, as shown in FIG. 12, a separate three-state valve 62 may be employed for each actuator 16 and 46, allowing pressurized air to be introduced into, maintained within, and exhausted from the actuator. Valves 62 are typically electromechanical devices that respond to inputs from microcomputer 60. When closed, valves 62 maintain a fixed number of moles of air within enclosure 18, thereby initiating passive operation of the actuators as springs. With valves 62 opened and controlling the supply of air to actuators 16 and 46 from line 52, as well as the exhaust of air from actuators 16 and 46 to the environment, the actuators are effectively switched to the active operating mode. In an alternative arrangement, separate valves 62 are employed to control the introduction of pressurized air into, and relief of pressurized air from, the enclosure 18 of each actuator 16 and 46. Typically, air regulation valves 62 are located proximate the suspension subsystem 48 they control to decrease actuator response time.

As will be readily appreciated, air regulation valves 62 may also be utilized to regulate the pressure, flow, or volume of air flowing through air line 52 to actuators 16 and 46 in response to a control signal from microcomputer 60. For example, valve 62 may have a controlled, variable opening used to control the pressure of air applied to actuators 16 or 46 through line 52 or may provide brief bursts of air through the line 52 until the desired pressure in the actuators 16 or 46 is reached. While the maximum regulatable pressure available from valve 62 is determined by the operating pressure limit of air compressor 54 and storage tank 58, an additional microcomputer control signal supplied to compressor 54 allows this limit to be adjusted. This combined control of air regulation valves 62 and compressor 54 allows the pressure of the air within actuators 16 and 46 to be precisely controlled over a wide range of pressures.

Now that the elements of system 50 that respond to the microcomputer 60 control signals have been briefly discussed, the manner in which those control signals are produced will be considered. More particularly, a number of system 50 status signals are produced by sensors whose outputs are supplied to microprocessor 61 via the interfaces 63 of microcomputer 60. For example, a wheel position indicator 64 is incorporated in each suspension subsystem 48 to provide microprocessor 61 with an indication of the elevation of chassis 42 with respect to wheel 34. This information is stored by microprocessor 61 in random-access memory (RAM) 65 of microcomputer 60 and allows microprocessor 61 to determine both the amount of correction required to produce a particular elevation of chassis 42, as well as the current extent of actuator 16 and 46 contraction. In this manner, the wheel position indicators 64 provide ongoing feedback to microcompressor 61 regarding one aspect of the operation of system 50.

A second form of feedback required by microprocessor 61 to control suspension subsystems 48 is provided by pressure transducers 66. A separate pressure transducer 66 senses the air pressure within each tension actuator 16 and 46 and each transducer 66 responds by producing an electrical signal that is proportional to the pressure sensed. The signal supplied to microprocessor 16 via interface 63 is stored in RAM 65 and allows microprocessor 61 to determine the pressure adjustments that must be made by air regulation valves 62 to achieve the desired elevational and compliance characteristics of each subsystem 48.

The data from wheel position indicator 64 and pressure transducers 66 allow microprocessor 61 to calculate the weight of the vehicle and the amount of loading from passengers, cargo and fuel. Microprocessor 61 can also be instructed to determine the load applied to each suspension subsystem 48. As will be appreciated, each of these various computations can be performed on a continuously updated basis.

While the wheel position indicators 64 and pressure transducers 66 provide feedback to microprocessor 61 regarding the current operating condition of the various subsystems 48, other sensors supply microprocessor 61 with information regarding the manner in which wheel position and actuator pressure are to be controlled.

More particularly, a pair of manual inputs 68, located in the passenger compartment of the automobile, provide the driver with direct control over chassis elevation and suspension compliance. The first of these manual inputs 68 is an elevational adjustment control 70, which allows the operator to adjust the elevation of chassis 42 with respect to wheels 34. Within an allowed adjustment range defined by maximum and minimum elevations of chassis 42, adjustment control 70 offers the driver either a plurality of discrete choices regarding chassis 42 elevation or a continuum of choices. While a separate adjustment control 70 may be provided for each suspension subsystem 48, allowing the elevation of chassis 42 with respect to each wheel 34 to be adjusted individually, a single control 70 is preferably used to adjust all subsystems 48. The signal produced by each elevational adjustment control 70 is proportional to the desired resultant elevation, or the required change in elevation, of chassis 42 and, in its digital form, is applied to microprocessor 61 via interface 63.

Upon receiving an elevational adjustment control signal, microprocessor 61 enters an Elevational Adjustment Routine whose instructions are stored in the read-only memory (ROM) 67 of microcompuer 60. Pursuant to the Elevational Adjustment Routine, microprocessor 61 accesses RAM 65 and retrieves the present elevation of chassis 42 with respect to wheel 34, as wellas the operating pressures of actuators 16 and 46, for each subsystem 48 to be adjusted. Microprocessor 61 then determines the necessary adjustment in air pressure for each actuator 16 and 46 from a look-up table stored in ROM 67 and containing data derived from force curves similar to those shown in FIG. 11. As will be appreciated, with information available regarding the current pressure and elevation, as well as the desired elevation, the look-up table indicates the necessary adjustments to be made in actuator pressure. The pressure corrections determined from the look-up table are then transferred by microprocessor 61 into control signals that are supplied to the air regulation valves 62. Alternatively, a classic closed-loop control system may be implemented in which microprocessor 61 uses only feedback information concerning current elevation and pressure to continually and automatically adjust actuator pressure until the proper elevation is obtained. Valves 62 respond by making the requisite adjustments to the pressure of the air supplied to the actuators 16 and 46. The wheel position indicators 64 then provide updated information to microprocessor 61, indicating that the appropriate adjustment has been made.

A second manual input 68 is provided in the form of a compliance adjustment control 72, which allows the stiffness of the suspension subsystems 48 to be adjusted independently of the elevation of chassis 42. As noted, the location of the compliance adjustment control 72 inside the automobile's passenger compartment allows the operator to control compliance from within the vehicle. Separate controls 72 may be provided for each suspension subsystem 48, allowing the compliance of each to be adjusted individually, or a single control 72 may be used for all subsystems 48. The compliance adjustment controls 72 may allow one of a plurality of discrete compliances to be selected or, alternatively, any compliance along a continuum of compliances defining a predetermined allowable compliance range. Microprocessor 61 receives a digital signal from interface 63 corresponding to the output of each compliance adjustment selector 72. This digital signal is proportional either to the desired resultant compliance or the desired change in compliance of a particular subsystem 48.

In accordance with a Compliance Adjustment Routine stored in ROM 67, microprocessor 61 initially identifies the suspension subsystems 48 where compliance is to be adjusted. Then, the current information concerning subsystem 48 operating pressure and elevation is obtained from RAM 65. Microprocessor 61 uses this information to identify the current operating point of actuators 16 and 46 and, thus, the current compliance of the system. From the look-up table stored in ROM 67, microprocessor 61 selects the relative pressures in actuators 16 and 46 required to cause operation at a new operating point having the desired compliance. If subsystem 48 employs a single tension actuator 16, the new operating point will involve a change in chassis 42 elevation. With a dual tension actuator subsystem 48 involved, however, the new compliance operating point can be selected by microprocessor 61 such that the elevation of chassis 42 will not be altered. A control signal indicative of the necessary pressure corrections is output by microprocessor 61 to the air regulation valve 62 of the subsystems 48 whose compliance is to be adjusted. The valves 62 respond to providing air at the requisite pressures to the actuators 16 and 46.

As will be appreciated from the discussion below, the Elevational Adjustment Routine and Compliance Adjustment Routine stored in ROM 67 also allow microprocessor 61 to automatically adjust system elevation and compliance in response to different vehicle loads or changing road or driving conditions. For example, when microprocessor 61 determines that the vehicle is heavily loaded, by analyzing data from wheel position indicators 64 and pressure transducers 66, the Compliance Adjustment Routine may instruct microprocessor 61 to stiffen suspension subsystems 48 by increasing the pressure of air supplied thereto (reducing the compliance of actuators 16 and 46). Similarly, when the input sensors described below indicate that the road being transversed by the automobile is relatively rough, the Elevational Adjustment and Compliance Adjustment Routines discussed above may instruct microprocessor 61 to initiate an increase in chassis elevation with respect to the roadway and a more compliant response from actuators 16 and 46.

In addition to the manual inputs 68 described above, microprocessor 61 relies upon information received from a plurality of automatic input sensors 74 to fully control the operation of the automotive suspension system 50. For example, a bump accelerometer 76 is included on steering knuckle 36 or swing arm 44 to detect the presence of forces exerted on these components in a direction that is substantially normal to the road surface over which wheel 34 is traveling. Location of bump accelerometer 76 on steering knuckle 36 or swing arm 44, rather than chassis 42, effectively anticipates forces before they are transmitted to the passenger compartment. For increased sensitivity, a separate bump accelerometer 76 can be included in each suspension subsystem 48. The signals produced by bump accelerometer 76 are proportional to the vertical acceleration of steering knuckle 36 or swing arm 44 and can either be stored in RAM 65 by way of microcomputer interface 63 or be used directly by microprocessor 61.

Pursuant to a Vertical Acceleration Compensation Routine stored in ROM 67, microprocessor 61 determines the anticipated displacement of chassis 42 with respect to each wheel 34 by computing the second integral of the signal received from accelerometer 76. Alternatively, or in addition to inputs from accelerometer 76, wheel position indicator 64 may also provide data which can be used to compute the anticipated displacement of chassis 42 with respect to each wheel. The desired response of subsystem 48 is available from ROM 67, by way of predetermined indicia stored therein, allowing microprocessor 61 to identify the appropriate operating point of subsystem 48 from the data stored in the look-up table provided in ROM 67. Microprocessor 61 than uses this information, along with the current operating characteristics retrieved from RAM 65, to compute the changes in chassis elevation and operating pressure required to achieve operation at the new operating point.

As will be appreciated, the predetermined operating indicia stored in ROM 67 can be varied to alter the response of the suspension subsystems 48 to the forces detected by bump accelerometers 76. For example, the indicia may dictate that high-frequency, low magnitude signals produced by bump accelerometer 76 in response to relatively minor, closely spaced road discontinuities are to be ignored by microprocessor 61. For relatively low frequency discontinuities of intermediate amplitude, however, the indica may require microprocessor 61 to select an operating point exhibiting a relatively high compliance. The microprocessor 61 may also be called upon to adjust the elevation of chassis 42 with respect to wheel 34 to minimize the influence the discontinuities have on vehicle ride. Alternatively, predetermined indicia may be selected to require microprocessor 61 to provide relatively uniform response for all frequencies of signals produced by bump accelerometer 76, thus limiting the range of new operating points that microprocessor 61 is allowed to select from the look-up table stored in ROM 67.

A second automatic input sensor 74 is the steering angle sensor 84. Preferably, steering angle sensor 84 is an optical encoder positioned along the steering column of the automobile. In such an arrangement, the pulses received by microprocessor 61 from sensor 84 indicate the angular orientation of the front wheels 34 with respect to a vertical plane passing longitudinal through chassis 42. The rate of which these pulses are received from sensor 84 further indicates the speed at which the wheels 34 are being turned. By continually monitoring and comparing these pulses, microprocessor 61 is also able to determine whether the wheels 34 are being straightened out or turned more. The signals from steering angle sensor 84 can either be stored in RAM 65 by way of microcomputer interface 63 or be used directly by microprocessor 61.

A third automatic input sensor 74 to be considered is a velocity sensor 86 whose output indicates both the speed of the vehicle and whether the speed is increasing or decreasing. As will be appreciated, the signal from velocity sensor 86 can easily be derived from the existing speedometer circuitry of the vehicle. Because acceleration is the first derivative of velocity, this information can be indirectly derived from the output of velocity sensor 86 by the appropriate conditioning circuitry. In addition, vehicle velocity can be inferred from the angular velocity of the engine output shaft, derived from existing tachometer circuitry of the vehicle, when coupled with gear ratio selection data and wheel size data. Acceleration or deceleration of the vehicle can be anticipated by monitoring the position, and directional changes in position, of the acceleration pedal. The signals from velocity sensor 86 can either be stored in RAM 65 by way of microcomputer interface 63 or be used directly by microprocessor 61.

A fourth automatic input sensor 74 to be considered is braking sensor 87, whose output indicates whether or not the vehicle is being braked and, preferably, the magnitude of the braking force applied at each wheel. The required output information may be derived from sensing the hydraulic pressure of the brake fluid supplied to the brakes at each wheel or may be obtained from an existing electrically controlled braking system. The signals from braking sensor 87 can either be stored in RAM 65 by way of microcomputer interface 63 or be used directly by microprocessor 61.

A fifth automatic input sensor 74 to be considered is roll sensor 78, which senses laterally directly forces applied to chassis 42. As noted previously, when an automobile turns a corner, inertial forces upon the automobile tend to produce a variation in the elevation of chassis 42 measured on the driver and passenger sides of the vehicle. This characteristic may be defined as "roll" and is sensed by, for example, a pendulum, which produces a signal whose magnitude is directly proportional to the magnitude of the lateral thrust experienced by passengers in the vehicle. As will be appreciated, one or several roll sensors 78 may be utilized, with each sensor 78 preferably located proximate to a side of chassis 42 or near subsystems 48, where the influence of roll is most pronounced. As other alternatives to the use of a pendulum as roll sensor 78, a lateral accelerometer or vertical gyro may be employed. In addition, a feedback signal indicative of roll can be inferred by sensing the elevation of chassis 42 with respect to each wheel position indicator 64. The signals from roll sensor 78 can either be stored in RAM 65 by way of interface 63 of microcomputer 60, or used directly by microprocessor 61.

Pursuant to a Roll Compensation Routine stored in ROM 67, microprocessor 61 initially retrieves from RAM 65 the current operating characteristics of subsystems 48, and retreives the current data from sensors 74 either directly or via RAM 65. Microprocessor 61 then uses data from the steering angle sensor 84 and the velocity sensor 86 to anticipate the likely direction and magnitude of lateral roll forces on the vehicle, before roll is detected by roll sensor 78. Predetermined roll response inidicia, stored in ROM 67, indicate the desired response of system 50. The indicia preferably require microprocessor 61 to make the system adjustments necessary to minimize the lateral thrust experienced by passengers in the vehicle, as indicated by minimum deflection of roll sensor 78. Normally, this involves adjusting the elevation of chassis 42 at each of the suspension subsystems 48 at the same time a turn is made. For example, when a left turn is made by the vehicle, the subsystems 48 on the left side of the vehicle are controlled to decrease chassis 42 elevation, while the right side subsystems 48 are controlled to increase chassis 42 elevation. As steering angle sensor 84 indicates that the steered wheels 34 are being straightened out, or the velocity sensor 86 or braking sensor 87 indicates that the vehicle is slowing down, adjustments to the control of chassis 42 elevation will be preferably smaller. Although compliance is less important than vehicle attitude under these circumstances, the roll respnse indicia may also cause the compliance of each suspension subsystem 48 to be adjusted. The particular roll response indicia selected may depend upon a number of factors including, for example, vehicle velocity or whether the vehicle is trasversing relatively flat or banked corners.

Regardless of the indicia selected, microprocessor 61 responds by accessing the portion of the ROM 67 look-up table indicated by the indicia to contain the desired operating point and adjusts the operating pressure of the various subsystem 48 actuators accordingly. Feedback from the roll sensor 78 and wheel position indicator 64 in each suspension subsystem 48 is then received by microprocessor 61, which confirms that the desired compensation has been produced.

A sixth automatic input sensor 74 to be considered is pitch sensor 80. Operation of pitch sensor 80 is similar to that of roll sensor 78 and its function is to detect the conditions of "dive" and "squat" experienced during abrupt deceleration and acceleration of the vehicle, respectively. One example of a pitch sensor 80 employs a precision pendulum and produces an output signal whose magnitude is proportional to the displacement of the pendulum. As will be appreciated, pitch sensor 80 is most advantageously located on the forward or rearward portion of chassis 42, where the displacement of chassis 42 is most pronounced. In addition, a pitch sensor 80 may be included at each extreme for increased sensing precision. As an alternative to the use of a pendulum for pitch sensor 80, the pitch of chassis 42 may be sensed by vertical accelerometers, located on the forward or rearward portion of chassis 42, or may be inferred from wheel position sensors 64. The signal produced by pitch sensor 80 is proportional to the magnitude of the device or squat experienced by chassis 42 and can either be stored in RAM 65 by way of microcomputer interface 63 or be used directly by microprocessor 61.

A seventh automatic input sensor 74 to be considered is a wheel traction sensor 89, whose output indicates whether the wheels of the vehicle are slipping in relation to the road surface. The wheel traction sensor 89 preferably indicates the magnitude of wheel slippage in the forward or rearward directions during acceleration, deceleration, or braking. This information may be produced by monitoring the angular velocity of the wheels and comparing it with the output of vehicle velocity sensor 86, or may be derived from an existing electronically controlled braking system. The signals from wheel traction sensor 89 can either be stored in RAM 65 by way of microcomputer interface 63 or be used directly by microprocessor 61.

A Traction Compensation Routine stored in ROM 67 causes microprocessor 61 to analyze the data provided by the velocity sensor 86, wheel position indicator 64, steering angle sensor 84, braking sensor 87, and pitch sensor 80 and produce the various output signals needed to level the vehicle chassis 42 and minimize wheel 34 slippage as indicated by wheel traction sensor 89. More particularly, microprocessor 61 retrieves the current operating characteristics of subsystems 48 from RAM 65 and data produced directly from sensors 74 or from RAM 65, and selects appropriate predetermined traction indicia stored in ROM 67. The traction indicia indicate new operating points of each subsystem 48 also stored in the look-up table stored in ROM 67. Microprocessor 61 then sends signals via interface 63 to air regulation valves 62 to adjust the pressure in actuators 16 and 46 of each suspension subsystem 48 until chassis 42 is leveled or until optimum traction of wheels 34 is obtained.

A number of factors are involved in the selection of the predetermined traction indicia including, for example, passenger comfort and the desired traction and braking characteristics of the vehicle exhibited during abrupt acceleration or deceleration or cornering. Addressing first the condition of abrupt acceleration, as indicated by velocity sensor 86, the traction indicia selected may direct microprocessor 61 to shift the operating point of the rear suspension subsystems 48 along the force curves to a point at which those subsystems are less compliant. In this manner, the tendency of the vehicle to undergo squat is reduced. Feedback from each wheel position indicator 64 can then be employed by microprocessor 61 pursuant to the Traction Compensation Routine to adjust the elevation of each subsystem 48, correcting any squat that was not previously avoided, and to increase traction, as indicated by wheel traction sensor 89, by increasing the pressure of wheels 34 against the road. As will be appreciated, the Traction Compensation Routine can also be interactively coupled to separated engine torque and fuel control systems to limit wheel slippage during acceleration.

The traction indicia selected are intended to produce a similar effect during abrupt deceleration of the vehicle, as indicated by velocity sensor 86 and braking sensor 87. More particularly, the indicia direct microprocessor 61 to shift the operating point of actuators 16 and 46 in the front suspension systems 48 to render those systems are less compliant. In this manner, the tendency of the front of the car to dive during braking is reduced. To further eliminate dive, the Traction Compensation Routine may institute elevational control of the suspension subsystems 48 to remove any dive sensed by the wheel position indicators 64 and incompletely compensated for otherwise. Thus, braking is assisted by increasing the pressure of wheels 34 against the road. As will be appreciated, the Traction Compensation Routine may also be interactively coupled to a computer-controlled braking system employed on the vehicle. Regardless of whether the vehicle is being accelerated or decelerated, once microprocessor 61 has determined the proper operating point of the subsystems in accordance with the Traction compensation Routine, as outlined above, output signals are provided to the air regulation valves 62 to produce the requisite changes in actuator pressure.

An eighth automatic input sensor 74 to be considered is the range sensor 82. Range sensor 82 may use, for example, radar, lasers, stereo light systems, ultrasonic, or infrared radiation to determine distance. Preferably, a separate range sensor 82 is employed in conjunction with each subsystem 48. In operation, range sensor 82 transmits, for example, an ultrasonic signal to the surface of the road immediately in front of wheel 34 and receives a reflected signal back from the surface. In response to the received ultrasonic signal, range sensor 82 produces an electrical signal whose magnitude is proportional to the displacement between sensor 82 and the point on the road surface in front of wheel 34 to which the ultrasonic energy was directed. In this manner, variations in road conditions can be sensed before they are experienced by the wheels 34. An Anticipatory Compensation Routine stored in ROM 67 allows microprocessor 61 to cause each suspension subsystem 48 to take corrective action as the sensed variation in the road surface reaches wheel 34, thereby minimizing the influence of such variations on the orientation of chassis 42. As a practical matter, the Anticipatory Compensation Routine is most effective at the relatively low vehicle operating speeds usually involved when road conditions are worst.

Pursuant to the Anticipatory Compensation Routine, microprocessor 61 initially retrieves the present operating status of each subsystem 48 from RAM 65, as well as predetermined anticipatory response inidicia stored in ROM 67. While the indicia may be selected in recognition of a variety of factors, typically they will be chosen to require microprocessor 61 to select a new operating point for each subsystem 48 that produces the least response by roll pendulum 78 and pitch pendulum 80. As will be appreciated, under these conditions the attitude of chassis 42 remains relatively unaffected by road variations. If the resultant response of the subsystem 48 is insufficient to fully correct for the influences exerted upon chassis 42, the systems discussed above then provide further feedback and control to minimize any such influences.

Considering the Anticipatory Compensation Routine in greater detail, it is noted that the ultrasonic ranging sensors 82 detect a variety of road surface features including, for example, the pressure of rocks and potholes. By inclusion of a more sophisticated interconnective network between the range sensors 82, additional features such as road banking and elevational changes may be anticipated. With a pothole detected by the range sensor 82 associated with the right forward suspension subsystem 48, the Anticipatory Compensation Routine would typically require microprocessor 61 to select an operating point for that subsequent 48 in which the position of wheel 34 first drops with respect to chassis 42 as the pothole is entered and then raises with respect to chassis 42 as the pothole is passed. Thus, wheel contact with the road surface is maintained, with a minimum of disturbance to the orientation of chassis 42 sensed by the other automatic input sensors 74. While maintained contact of the wheels with the road surface has the advantage of providing the driver greater vehicle control, it will be readily appreciated that the anticipatory compensation indicia stored in ROM 67 could require microprocessor 61 to select a new operating point for subsystem 48 in which the wheel 34 is lifted to avoid the pothole, assuming the speed of the vehicle as sensed by velocity sensor 86 is sufficient. In either arrangement, the control by microprocessor 61 is effected by control signals output to the air regulation valves 62, which initiate the change in operating conditions selected by microprocessor 61.

In the interactive ultrasonic ranging arrangement noted above, where, for example, banking is detected, the Anticipatory Compensation Routine would generally directly access the Roll Compensation Routine to produce an adjustment to the operating characteristics of the various subsystems 48 as discussed previously in conjunction with that routine. Feedback as to the effectiveness of the Anticipatory Compensation Routine is provided in each case by the various automatic input sensors 74 and the wheel position indicators 64.

Microprocessor 61 is also employed to operate the various suspension subsystems 48 in a substantially passive manner. For example, the desirability of adjusting system elevation or compliance may be a function of vehicle speed. Thus, the Elevational Adjustment and Compliance Adjustment Routines may be effectively overridden when the velocity sensor 86 indicates that the vehicle is traveling at a speed over come predetermined limit, switching the actuators to a passive mode of operation described in greater detail below. Similarly, the Anticipatory Compensation Routine may be disabled when the vehicle's speed exceeds some predetermined limit because the road surfaces over which an automobile travels at high speed are usually relatively smooth.

When a passive spring-like response is desired for actuator 16 is is provided with a fixed, predetermined amount of air. Actuator 46 can then be used to absorb shocks by venting it at a predetermined rate. The role of the two actuators can easily be reversed by maintaining a fixed volume of air in actuator 46, to achieve a spring-like response, and venting actuator 16, which will act like a shock absorber. As will be appreciated, the actuators operate in a unidirectional fashion when controlled in this manner. More particularly, assuming that actuators 16 and 46 have initially been designated for operation as a spring and shock absorber, respectively, when the wheel 34 hits a bump, actuator 16 immediately absorbs a portion of the energy transferred to the suspension subsystem 48. By venting actuator 46, some of this stored energy is dissipated. Venting additionally helps avoid pressure spikes that are greater than the actuator rating. Because the operation of actuator 16 while actuator 46 is being vented is irrelevant, additional air can be easily added to actuator 16 at this time, if desired.

Addressing passive control of the subsystems 48 in greater detail, microprocessor 61 initially accesss RAM 65 to obtain the current pressure within actuators 16 and 46 as well as the elevation of chassis 42 with respect to subsystem 48. From this information, microprocessor 61 estimates the load experienced by the subsystem 48. By using a Critical Damping Response Routine stored in ROM 67, microprocessor 61 is then able to determine the passive operating characteristics of actuators 16 and 46 needed to critically damp the response of subsystem 48. This information is output via interface 63 to valves 62 where the necessary control is effected, allowing the natural frequency of each subsystem 48 to be adjusted in response to, for example, changing load conditions.

As will be appreciated, each of the control routines discussed above are preferably combined by microprocessor 61 into a complete integrated control system for receiving information from the various manual inputs 68 and automatic sensor inputs 74 and providing control signals to valves 62 to achieve the desired operation of the various suspension subsystems 48. Implementation of control should be subject to the constraint of preserving control stability of the vehicle and may be achieved by either the active or passive modes described above or through a combination of the two. In addition, each of the control routines preferably monitors all of the manual input 68 and automatic sensor input 74 information stored in RAM 65, along the status and instructions of the other control routines stored in ROM 67, to provide the optimal response at the various subsystems 48 to changing driving conditions and operator requirements.

Those skilled in the art will recognize that the embodiments of the invention disclosed herein are exemplary in nature and that various changes can be made therein without departing from the scope and the spirit of the invention. In this regard, and as was previously mentioned, the invention is readily embodied in systems employed in other applications. For example, a tension-actuated suspension system constructed in accordance with the invention could be conveniently employed to isolate control circuitry employed on large industrial equipment. Further, it will be recognized that various modifications to the systems disclosed above can be made while remaining within the scope of the invention. For example, single and dual tension actuator systems can be employed in conjunction with widely varying control inputs and outputs. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A system for suspending a load from at least one reference frame, comprising:
    a pair of antagonistic, fluid responsive, radially expansible, axially contractible actuators, said actuator pair applying tensile forces between the load and the reference frame that decrease as said actuators contract;
    a fluid source, connected to said actuators, for supplying fluid to said actuators, said fluid causing said actuators to contract; and
    control means for controlling the supply of fluid from said fluid source to said actuators.

2. The system of claim 1, wherein said actuators are constructed to produce tensile forces between the load and the reference frame that decrease nonlinearly as said actuators contract.

3. The system of claim 2, wherein said fluid supplied to said actuators by said fluid source comprises air.

4. The system of claim 3, wherein said fluid source comprises an air compressor.

5. The system of claim 4, wherein said control means comprises at least one valve for controlling the supply of air from said air compressor to said actuators.

6. The system of claim 5, wherein said control means further comprises at least one pressure transducer means for producing an output indicative of the pressure of said air inside said actuators.

7. The system of claim 6, wherein said control means further comprises load position sensing means for producing an output indicative of the relative position of the load with respect to the reference frame.

8. The system of claim 7, wherein said control means further comprises processing means for receiving said output of said pressure transducer means and said output of said load position sensing means and producing control signals in response thereof, one of said control signals being provided to said valve to control the supply of air from said air compressor to said actuator.

9. The system of claim 8, wherein said control means further comprises load position adjustment means for producing an output indicative of a desired relative position of the load with respect to the reference frame, said output of said load position adjustment means being provided to said processing means, said processing means adjusting said control signals in response thereto, until the desired said relative position is achieved.

10. The system of claim 8, wherein said control means further comprises compliance adjustment means for producing an output indicative of a desired compliance of said system said output of said compliance adjustment means being provided to said processing means, said processing means adjusting said control signals in response thereto, causing said pressure of said air supplied to each said actuator in said actuator pair to be proportionally increased as less compliance is required and proportionally decreased as more compliance is required.

11. The system of claim 8, further comprising a plurality of said pairs of antagonistic actuators.

12. The system of claim 11, wherein said control means further comprises compliance adjustment means for producing an output indicative of a desired compliance of said system, said output of said compliance adjustment means being provided to said processing means, said processing means adjusting said control signals in response thereto, causing said pressure of said air supplied to each said actuator in each said actuator pair to be proportionally increased as less compliance is required and proportionally decreased as more compliance is required.

13. The system of claim 1, wherein said actuators are controllably compliant.

14. The system of claim 1, wherein said control means comprises at least one valve for controlling the supply of fluid from said fluid source to said actuator.

15. The system of claim 1, wherein said control means further comprises at least one pressure transducer means for producing an output indicative of the pressure inside said actuators.

16. The system of claim 1, wherein said control means further comprises load position sensing means for producing an output indicative of the relative position of the load with respect to the reference frame.

17. The system of claim 1, wherein said control means further comprises processing means for receiving said output of said pressure transducer means and said output of said load position sensing means and producing control signals in response thereto, one of said control signals being provided to said valve to control the supply of fluid from said fluid source to said actuator.

18. The system of claim 1, wherein said control means further comprises load position adjustment means for producing an output indicative of a desired relative position of the load with respect to the reference frame, said output of said load position adjustment means being provided to said processing means, said processing means adjusting said control signals in response thereto until the desired said relative position is achieved.

19. The system of claim 1, wherein said control means comprises compliance adjustment means for causing the pressure of said fluid supplied to said each actuator in said actuator pair to be proportionally increased as less compliance is required and to be proportionally decreased as more compliance is required.

20. The system of claim 1, wherein a plurality of said actuators.

21. A system for suspending a load from at least one reference frame, comprising:
a pair of antagonistic, fluid responsive, radially expansible, axially contractible actuators, said actuator pair applying antagonstic tensile forces between the load and the reference frame;
a fluid source, connected to both said actuators of said pair, for supplying fluid to said actuators to cause said actuators to contract; and
control means for controlling the supply of fluid from said fluid source to both said actuators.

22. The system of claim 21, further comprising a plurality of said pairs of antagonistic actuators.

23. A vehicle suspension system, for suspending the chassis of a vehicle from the support structure associated with each of its wheels, said system comprising:

a pair of antagonistic, fluid responsive, radially expansible, axially contractible actuators connected between the chassis and the support structure associated with each wheel, each said pair of antagonistic actuators applying antagonistic tensile forces between the chassis and the support structure associated with the corresponding wheel;
a fluid source for supplying fluid to both actuators in each said pair to cause said actuators to contract axially;
at least one said valve, connecting said fluid source and said actuators in each said pair, for controlling the supply of fluid from said fluid source to each said actuator;
pressure transducer means for producing outputs indicative of the pressure of the fluid within each said actuator of each said pair;
chassis position sensing means for producing outputs indicative of the relative position of the chassis with respect to the support structure associated with each wheel;
processing means for receiving said outputs of said pressure transducer means and said outputs of said chassis position sensing means and producing control signals in response thereto, said control signals being provided to said valves to control both the flow and pressure of said fluid supplied to each said actuator of each said pair.

24. The system of claim 23, further comprising chassis position adjustment means for producing an output indicative of a desired relative position of the chassis with respect to the support structure, said output of said chassis position adjustment means being provided to said processing means, said processing means adjusting said control signals in response thereto until the desired said relative position is achieved.

25. The system of claim 23, further comprising compliance adjustment means for producing an output indicative of a desired compliance of said system, said output of said compliance adjustment means being provided to said processing means, said processing means adjusting said control signals in response thereto, causing said pressure of said air supplied to each said actuator of each said pair to be proportionally increased as less compliance is required and proportionally decreased as more compliance is required.

26. The system of claim 23, further comprising range-sensing means for producing output indicative of the distance between the chassis and the road surface a predetermined distance in front of each wheel, said output of said range-sensing means being provided to said processing means which responsively adjusts said control signals provided to said valve.

27. The system of claim 23, further comprising inertial response sensing means for producing an output indicative of the inertial response of the chassis to changes in attitude, said output of said inertial response sensing means being provided to said processing means which responsively adjusts said control signals provided to said valve.

28. The system of claim 23, further comprising wheel orientation sensing means for producing an output indicative of the steering direction of the wheels with respect to a vertical reference plane extending longitudinally with respect to the chassis, said output of said wheel orientation sensing means being provided to said processing means which responsively adjusts said control signals provided to said valve.

29. The system of claim 23, further comprising vehicle velocity sensing means for producing an output indicative of the speed of the vehicle, said output of said vehicle velocity sensing means being provided to said processing means which responsively adjusts said control signals provided to said valve.

30. The system of claim 23, further comprising vehicle braking sensing means for producing an output indicative of the magnitude of the braking forces applied to the wheels of the vehicle, said output of said vehicle braking sensing means being provided to said processing means which responsively adjusts said control signals provided to said valve.

31. The system of claim 23, further comprising wheel traction sensing means for producing an output indicative of the magnitude and direction of the slippage of each wheel on the road, said output of said wheel traction sensing means being provided to said processing means which responsively adjusts said control signals provided to said valve.

* * * * *

UNITED STATES PATENT AND TRADEMARK OFFICE
CERTIFICATE OF CORRECTION

PATENT NO. : 4,826,206

DATED : May 2, 1989

INVENTOR(S) : Guy Immega

It is certified that error appears in the above-identified patent and that said Letters Patent is hereby corrected as shown below:

| Column | Line | |
|---|---|---|
| 2 | 27 | "primiarly" should be --primarily-- |
| 2 | 35 | "position" should be --positions-- |
| 2 | 57 | "including" should be --include-- |
| 3 | 20 | "stil" should be --still-- |
| 3 | 33 | "reactin" should be --reaction-- |
| 3 | 42 | "affect" should be --effect-- |
| 3 | 46 | "stablizer" should be --stabilizer-- |
| 5 | 55 | "examplary" should be --exemplary-- |
| 7 | 59 | "benoted" should be --be noted-- |
| 8 | 41 | "susupended" should be --suspended-- |
| 8 | 41 | "constraction" should be --contraction-- |
| 8 | 61 | "describd" should be --described-- |
| 10 | 3 | "shocker" should be --shock-- |
| 10 | 55 | "chracteristic" should be --characteristic-- |
| 10 | 61 | "opposite" should be --opposition-- |
| 11 | 35 | insert a comma (--,--) after "axes" |
| 11 | 41 | "are" should be --is-- |
| 11 | 45 | "extends" should be --extents-- |
| 11 | 52 | "of" should be --a-- |
| 12 | 20 | "duel" should be --dual-- |
| 12 | 39 | "forces" should be --force-- |
| 12 | 45 | "maitained" should be --maintained-- |
| 12 | 51 | "are" should be --is-- |
| 13 | 8 | "is" should be --its-- |
| 13 | 21 | insert --the-- after "whether" |
| 16 | 27 | "wellas" should be --well as-- |
| 18 | 26 | "indica" should be --indicia-- |
| 18 | 44 | "longitudinal" should be --longitudinally-- |

UNITED STATES PATENT AND TRADEMARK OFFICE
CERTIFICATE OF CORRECTION

PATENT NO.   : 4,826,206
DATED        : May 2, 1989
INVENTOR(S)  : Guy Immega

It is certified that error appears in the above-identified patent and that said Letters Patent is hereby corrected as shown below:

| Column | Line | |
|--------|------|---|
| 19 | 17 | "directly" should be --directed-- |
| 19 | 41 | "retreives" should be --retrieves-- |
| 19 | 66 | "respnse" should be --response-- |
| 20 | 2  | "trasversing" should be --traversing-- |
| 20 | 32 | "device" should be --dive-- |
| 21 | 21 | "separated" should be --separate-- |
| 21 | 29 | delete "are" before "less" |
| 21 | 43 | "compensation" should be --Compensation-- |
| 22 | 7  | "inidicia" should be --indicia-- |
| 22 | 31 | "subsequent" should be --subsystem-- |
| 22 | 33 | "raises" should be --rises-- |
| 22 | 67 | "come" should be --some-- |
| 23 | 28 | "accesss" should be --accesses-- |
| 23 | 42 | "are" should be --is-- |
| 23 | 54 | insert --with-- after "along" |
| 24 | 14 | "suspensing" should be --suspending-- |
| 24 | 49 | "thereof" should be --thereto-- |
| 24 | 51 | "actuator" should be --actuators-- |
| 25 | 35 | "actuator" should be --actuators-- |

UNITED STATES PATENT AND TRADEMARK OFFICE
CERTIFICATE OF CORRECTION

PATENT NO. : 4,826,206

DATED : May 2, 1989

INVENTOR(S) : Guy Immega

It is certified that error appears in the above-identified patent and that said Letters Patent is hereby corrected as shown below:

| Column | Line | |
|---|---|---|
| 25 | 48 | delete "to be" after "and" |
| 25 | 50 | delete "wherein" and insert therefor --further comprising-- |
| 25 | 51 | add --pairs of antagonistic-- before "actuators" |
| 25 | 56 | "antagonstic" should be --antagonistic-- |
| 26 | 48 | "output" should be --outputs-- |

Signed and Sealed this

Fifteenth Day of October, 1991

Attest:

HARRY F. MANBECK, JR.

*Attesting Officer*   *Commissioner of Patents and Trademarks*